US011631436B1

(12) United States Patent
Luebben et al.

(10) Patent No.: US 11,631,436 B1
(45) Date of Patent: Apr. 18, 2023

(54) ELECTRONIC DEVICE HAVING AN INTERIOR GAS SPACE THAT INCLUDES ONE OR MORE DESICCANTS

(71) Applicant: Seagate Technology LLC, Fremont, CA (US)

(72) Inventors: Silvia Luebben, Golden, CO (US); Dipeshkumar J. Purani, Shakopee, MN (US); Brenda K. Drake, Tabernash, CO (US); Jeffrey James Croxall, Northglenn, CO (US); Paul A. Beatty, Fort Collins, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/532,902

(22) Filed: Nov. 22, 2021

(51) Int. Cl.
*G11B 33/14* (2006.01)
(52) U.S. Cl.
CPC ........ *G11B 33/1453* (2013.01); *G11B 33/146* (2013.01); *G11B 33/1466* (2013.01)
(58) Field of Classification Search
None
See application file for complete search history.

(56) References Cited

U.S. PATENT DOCUMENTS

| | | | |
|---|---|---|---|
| 4,831,475 A | 5/1989 | Kakuda et al. | |
| 4,967,295 A | 10/1990 | Yamauchi et al. | |
| 5,075,807 A | 12/1991 | Inoue et al. | |
| 7,478,760 B2 | 1/2009 | Beatty et al. | |
| 7,695,547 B2 | 4/2010 | Smith | |
| 8,693,135 B2 | 4/2014 | Brown | |
| 8,867,164 B2 | 10/2014 | Brown | |
| 9,302,795 B1 | 4/2016 | Beatty et al. | |
| 10,566,031 B2 | 2/2020 | Brand | |
| 10,641,551 B2 | 5/2020 | Van Asbrouck | |
| 2009/0116141 A1* | 5/2009 | Brown ................. | G11B 25/043 360/97.12 |
| 2009/0188386 A1 | 7/2009 | Beatty et al. | |
| 2010/0296191 A1 | 11/2010 | Kim et al. | |
| 2012/0039000 A1* | 2/2012 | Brown ................. | G11B 25/043 360/97.12 |
| 2014/0377143 A1* | 12/2014 | Ellison ................. | G11B 33/146 422/222 |

FOREIGN PATENT DOCUMENTS

| | | | | |
|---|---|---|---|---|
| CN | 102403016 A | * | 4/2012 | ........ G11B 25/043 |
| JP | 2012120953 A | * | 6/2012 | |
| JP | 2018130719 A | * | 8/2018 | |
| JP | 2021034083 A | | 3/2021 | |

OTHER PUBLICATIONS

"Zeolite Y," Zeolyst International, retrieved from 'https://www.zeolyst.com/our-products/standard-zeolite-powders/zeolite-y.html', on Nov. 16, 2021, (6 pages).
"Desiccant Air-Conditioner Adsorption Heat Pump," Mitsubishi Plastics, Inc. (In Japan), Published May 2010, (4 pages).

* cited by examiner

*Primary Examiner* — William J Klimowicz
(74) *Attorney, Agent, or Firm* — Kagan Binder, PLLC

(57) ABSTRACT

The present disclosure includes embodiments of an electronic device having a housing that defines an interior gas space, and desiccant disposed therein. The desiccant includes one or more zeolite compositions to manage the relative humidity of the interior gas space.

21 Claims, 2 Drawing Sheets

ELECTRONIC DEVICE HAVING AN INTERIOR GAS SPACE THAT INCLUDES ONE OR MORE DESICCANTS

BACKGROUND

The present disclosure relates to electronic devices such as data storage devices like hard disk drives (HDDs) (internal and/or external), network attached storage (NAS), and the like. There is a continuing need to solve problems related to managing the relative humidity within electronic devices such as data storage devices that use electrical power to store and retrieve data.

SUMMARY

Embodiments of the present disclosure include an electronic device including:
a housing having an interior gas space;
one or more electronic components disposed within the housing; and
a desiccant component comprising one or more zeolite compositions in an amount that can adsorb and/or desorb water vapor to provide the interior gas space with a relative humidity from greater than 0.5% to less than 8% at a temperature in the range from 0 to 75° C. as determined by the Relative Humidity test method.

Embodiments of the present disclosure also include controlling relative humidity in an electronic device, where the method includes:
providing an electronic device comprising:
a housing having an interior gas space;
one or more electronic components disposed within the housing; and
a desiccant component; and
operating the electronic device to perform read/write operations, wherein relative humidity is passively controlled from greater than 0.5% to less than 8% at a temperature in the range from 0 to 75° C. as determined by the Relative Humidity test method.

DETAILED DESCRIPTION

The present disclosure relates to managing the relative humidity within electronic devices such as data storage devices that have an interior gas space and one or more electronic components disposed therein, and use electrical power to store and retrieve data. Non-limiting examples of data storage devices include hard disk drives (internal and/or external), network attached storage (NAS), and the like. Examples of hard disc drives are reported in U.S. Pat. Nos. 7,478,760 (Beatty et al.) and 7,695,547 (Smith), wherein the entireties of said patents are incorporated herein by reference.

Figure 1:
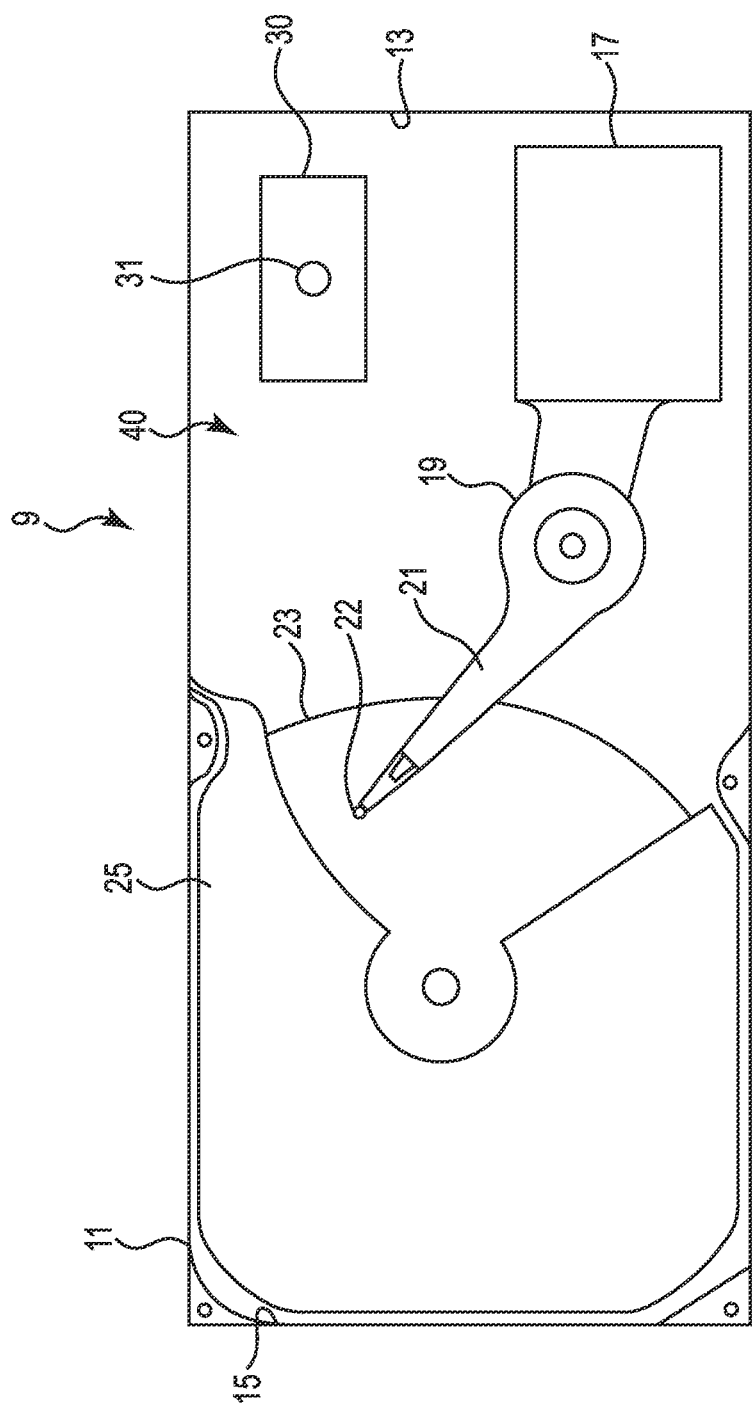
FIG. 1 is an illustration of a top view of a hard disk drive having its top cover removed and with a disk separator plate located therein.

For illustration purposes, FIG. 1 illustrates a hard disk drive 9 as an example of an electronic device according to the present disclosure that includes a housing having an interior gas space 40 and one or more electronic components disposed within the housing. As shown in FIG. 1, hard disk drive 9 has a housing 11 with side walls 15 and 13. Hard disk drive 9 also includes a top enclosing the housing, but the top is not shown in FIG. 1 for illustration purposes. Contained within the housing 11 is one or more electronic components. For illustration purposes, FIG. 1 shows an actuator drive assembly 17 as a nom-limiting example of electronic component. An actuator 19, along with actuator arms 21 that carry read/write heads 22 are part of the drive assembly 17. One or more disk separator plates can be mounted between each of the disks in the disk stack 23 and that are rotatably positioned in hard disk drive 9. For illustration purposes, as shown in FIG. 1, a disk separator plate 25 can optionally be positioned over the top disk 23 and mounted to the side walls 15 and 13, or in any other convenient manner, to the housing 11 of hard disk drive 9. It is noted that a disk separator plate does not need to be positioned over the top disk in a disk in a disk stack 23. Although disk separator plates generally have a flat, plate-like, cross-sectional profile similar to the rotatable, recording disks 23, disk separator plates are generally less extensive (not co-extensive) with an adjacent recording disk 23. For example, for illustrations purposes, FIG. 1 shows that the major surface of disk separator plate 25 covers only a portion of an adjacent, rotatable, recording disk in disk stack 23. This provides enough space to permit an actuator arm carrying a read/write head such as arm 21 and head 22, respectively, to actuate back from forth during reading and writing operations from an inside diameter to an outside diameter of a disk in disk stack 23 without contacting a disk separator plate. FIG. 1. also schematically represents an environmental control module (ECM) 30, Which can include one or more compositions and/or devices for managing relative humidity (discussed below).

In some embodiments, for desirable performance and reliability characteristics in disk drives an operating atmosphere (e.g., interior gas space 40) can include an initial fill of a gas mixture that includes primarily helium gas and a second minor gas fraction consisting of a gaseous oxidizing agent component (oxidizer) for the entire operational life of the drive. The purpose of the primarily helium environment is to reduce gas turbulence induced vibration of the drives internal components to facilitate track follow capability across disk track widths of 100 nm or less. As the fraction of helium is decreased (e.g., from 100%), the vibrational performance of the drive mechanics can degrade, suggesting it can be beneficial to limit the non-helium oxidizing gas constituents to a minimum mole fraction as desired. The helium gas is present in the interior gas space at a mole fraction of 99 percent or less based on the total gas in the interior gas space (e.g., from 80 to 99 percent, from 80 to 95 percent, from 85 to 95 percent, or even from 85-90 percent). The second minor gas component, the gaseous oxidizing agent component can oxidize inorganic and/or organic materials and limit their accumulation on one or more components within the interior of an electronic device such as a hard disk drive as desired (e.g., to maintain one or more electronic components within the interior space in as-built conditions). Chemical reactions between the gaseous oxidizing agent component and inorganic and/or organic materials is believed to result in the formation of gaseous by-products that are free to transport away. An example of providing an interior gas space of a hard disk drive with gaseous oxidizing agent component (e.g., oxygen) is further discussed in U.S. Pat. No. 11,024,343 (Luebben et al.), wherein the entirety of said patent is incorporated herein by reference.

The present disclosure can be used with electronic devices that are sealed or unsealed with respect to their surrounding environment. In some embodiments, an electronic device can be a hermetically sealed electronic device, which can be defined by, e.g., the amount of gas that leaks from the electronic device after it has been sealed (e.g., a welded HDD). In some embodiments, the interior gas space includes helium gas and the hermetically sealed electronic device has a helium leak rate of $50 \times 10^{-8}$ atm (atmosphere) cc (cubic centimeter)/ second or less at 25° C.; $20 \times 10^{-8}$ atm cc / second or less, $10 \times 10^{-8}$ atm cc/second or less; $5 \times 10^{-8}$ atm cc/second or less at 25° C.; or even $4.2 \times 10^{-8}$ atm cc/second or less at 25° C.

The present disclosure involves maintaining relative humidity within the interior gas space (e.g., interior gas space 40) of an electronic device within a target range for desired performance and reliability. In some embodiments, having a relative humidity greater than 0% is desired to avoid one or more undesirable consequences to an undue degree because relative humidity is "too low" such as head-disc interface failure in a hard disc drive due to, e.g., excessive wear, "smearing", and the like. Smearing refers to contamination (e.g., a deposit of organic material) that may deposit on the surface of a recording disk and "smear" as a recording head passes over it while the recording disk rotates. Undue smearing can degrade reading from and/or writing to the disk. At the same time, it is desirable to maintain relative humidity low enough to avoid one or more failures such as oxidation and corrosion of sensitive electronic materials in a data storage device (e.g., undue oxidation of a reader in a hard drive), and the like. For example, if the humidity is "too high" then there can be an increased tendency for ionic contaminants to migrate and forms spears on a recording head.

As used herein, "relative humidity" refers to the ratio of the partial pressure water vapor in a mixture of gas (e.g., air) and water vapor to the equilibrium vapor pressure of water vapor over a flat surface of water at a given temperature. The ratio can then be expressed as a percentage.

The inventors of the present disclosure discovered that certain zeolites (discussed below) can maintain a relative humidity in an electronic device (e.g., sealed hard disk drive) drive that is greater than 0% but not too high. In some embodiments, an electronic device can include one or more zeolite compositions in an amount that can adsorb and/or desorb water vapor to provide the interior gas space of the electronic device with a relative humidity from greater than 0.5% to less than 8%, from 0.6% to 7.5%, from 0.7% to 7%, from 0.8% to 6.5%, from 0.9% to 6%, or even from 1% to 5%.

Relative humidity as reported in the present disclosure is determined by the Relative Humidity test method as follows:

A container referred to as environmental control module (ECM) is filled with approximately 0.5 to 2 grams of zeolite composition to be tested and placed in a hard disk drive (HDD), which is welded shut and filled with high purity helium gas. The welded HDD is sealed so that it has a helium leak rate of $50 \times 10^{-8}$ atm (atmosphere) cc (cubic centimeter)/second or less at 25° C. Each sealed HDD is operated to rotate/spin the disk, but not to perform read or write operations ("spin only"). Each HDD is placed in a test chamber so that the interior gas temperature of each HDD is maintained at a temperature of 60° C. for a time period of about 1000 hours. Each HDD includes a relative humidity (RH) sensor that monitors the relative humidity during this time period. Examples of such RH sensors are commercially available under the tradenames HSHCAL001B humidity sensor from ALPS Alpine; SHTC1-CSE-03 humidity sensor from Sensirion; or Sht4x humidity sensor from Sensirion. At the end of testing an average relative humidity is reported for each HDD. The distribution of average relative humidities is compared with the minimum (e.g., 0.5%, 1%, etc.) and maximum (e.g., 5%, 8%, etc.) allowable relative humidities to determine acceptability of the zeolite composition. If 99% or more of the HDDs are between the minimum and maximum, then the zeolite composition is considered to provide the interior gas space of the HDD with a relative humidity from greater than 0.5% to less than 8% at a temperature in the range from 0 to 75° C. as determined by the Relative Humidity test method.

The range of target relative humidity provided by the present disclosure is desirably maintained throughout the lifetime of the electronic device. In some embodiments, an electronic device can include one or more zeolite compositions in an amount that can adsorb and/or desorb water vapor to provide the interior gas space of the electronic device with a relative humidity as described herein for a time period of at least 6 months, at least one year, at least 2 years, at least 3 years, at least 4 years, at least 5 years, at least 6 years, or even at least 7 years (e.g., from 6 months to 7.5 years, or even from 5 to 7 years).

The range of target relative humidity provided by the present disclosure is desirably maintained throughout a range of temperatures that the interior gas space of an electronic device would be expected to be exposed to during one or more of manufacturing, storage, transportation, operation, and the like. In some embodiments, an electronic device can include one or more zeolite compositions in an amount that can adsorb and/or desorb water vapor to provide the interior gas space of the electronic device with a relative humidity as described herein at a temperature from 0° C. to 75° C., from 0° C. to 70° C., or even from 5° C. to 65° C.

An electronic device can include at least a desiccant component to help control relative humidity of the interior gas space of the electronic device. As used herein, a "desiccant component" refers to one or more materials that can absorb or desorb water vapor at the same rates at equilibrium for a given temperature. The equilibrium relative humidity can depend on, e.g., the type of desiccant, the volume or amount of the desiccant, the total water in a closed system (e.g., in a gas (e.g., air) and in the desiccant), whether and to what degree an electronic device is sealed relative to the surrounding environment, temperature, and the like.

A desiccant component can include one or more zeolite compositions. As used herein, a "zeolite composition" is a solid, microporous, aluminosilicate mineral that can be used as an adsorbent and includes at least silicon, aluminum, and oxygen. A zeolite composition may optionally contain one or more additional elements such as phosphorus, boron, gallium, germanium, among others, and combinations thereof.

Due to the pore structure of molecular dimensions, a zeolite composition has a property to selectively sort molecules primarily based on physical size by size exclusion. The maximum size of a molecular or ionic species that can enter a pore of a zeolite composition is controlled by the dimensions of the pore channel.

Zeolite compositions have the general formula $M_xAl_xSi_{1-x}O_2 \cdot yH_2O$ where M is either a metal ion or $H^+$. The value of x is between 0 and 1 and y is the number of water molecules in the formula unit. Although there are a wide range of possible structures, zeolites are formed by linking corner oxygen atoms of tetrahedra to form covalent network structures.

Zeolite compositions can include a wide variety of cations, which compensate for the overall negative charge due to the presence of $AlO_4$ tetrahedra in the zeolite framework. Because Si has a 4+ valence and Al has a 3+ valence, when $SiO_4$ tetrahedra and $AlO_4$ tetrahedra are arranged and linked in a three-dimensional, crystal lattice, an overall negative charge is present in the crystalline structure which is neutralized by the presence of a counterion (cation). Non-limiting examples of cations include sodium cations, potassium cations, calcium cations, magnesium cations, among others. Cations in a zeolite composition can be exchanged for one or more other cations (discussed below).

Zeolite compositions can occur naturally or be synthesized. In addition, a zeolite composition can be modified to change one or more properties such dealumination to increase its ratio of $SiO_2$ (silica) to $Al_2O_3$ (alumina) (described further below).

In some embodiments, a zeolite composition can have an average pore size greater than 3 angstroms, greater than 4 angstroms, greater than 5 angstroms, greater than 6 angstroms, greater than 6 angstroms, greater than 7 angstroms, greater than 8 angstroms, greater than 9 angstroms, greater than 10 angstroms, greater than 11 angstroms, greater than 12 angstroms, or even greater than 13 angstroms. In some embodiments, a zeolite composition according to the present disclosure can have an average pore size in the range from 4 to 20 angstroms, from 6 to 15 angstroms, or even from 10 to 15 angstroms.

According to the present disclosure, one or more zeolite compositions can be selected to control relative humidity within a target range as described herein, especially over an extended period of time that corresponds to the service life of an electronic device. For example, as described above, one or more zeolite composition can be disposed within an electronic device in an amount that can adsorb and/or desorb water vapor to provide the interior gas space with a relative humidity, e.g., from greater than 0.5% to less than 8% over a temperature range under working conditions as described herein.

Non-limiting examples of zeolite compositions defined by one or more properties and that can control relative humidity within a target range according to the present disclosure are described herein below. The various zeolite compositions described below can be used alone or in combination with one or more other zeolite compositions.

In some embodiments, a zeolite composition according to the present disclosure can include can have a mole ratio of $SiO_2$ (silica) to $Al_2O_3$ (alumina) equal to 3 or greater, 3.5 or greater, greater than 4, greater than 4.5, greater than 5, greater than 5.5, greater than 6, greater than 6.5, greater than 7, greater than 8, greater than 9, or even greater than 10. In some embodiments, a zeolite composition according to the present disclosure can include can have a mole ratio of $SiO_2$ to $Al_2O_3$ in the range from 3 to 30, from 4 to 20, or even from 4.5 to 15.

In some embodiments, a zeolite composition having a mole ratio of $SiO_2$ to $Al_2O_3$ can be made by modifying a zeolite composition to have relatively higher silica content. For example, a zeolite composition can be modified by a chemical, post-synthesis to increase the silica content by a process known as dealumination.

Zeolite compositions can be modified by a partial or total exchange of a cation (e.g., a "native" cation) with different cation that may provide the zeolite composition with more desirable properties. A native cation can refer to a cation that was originally present in a natural or synthetic zeolite composition. In some embodiments, a zeolite composition according to the present disclosure that has been so modified can include a cation chosen from hydrogen, fluoride, ammonium, quaternary ammonium, and combinations thereof. In some embodiments, a zeolite composition according to the present disclosure can include both native cations and "exchanged" cations. As mentioned above, native cations include sodium, potassium, calcium, magnesium, and combinations thereof. A non-limiting example of a zeolite composition according to the present disclosure can include at least a portion of the entirety of a native cation such as sodium (Na) cations that are replaced with ammonium cations and then the material is calcinated to lose $NH_3$ and give a partially or totally exchanged H-zeolite.

In some embodiments, one or more zeolite compositions having a particular framework identified by the International Zeolite Associated can be selected as a zeolite composition according to the present disclosure. The framework or structure of a zeolite composition is examined by the Zeolite Association Structure Commission, which provides a three-letter designation for examined compositions. In some embodiments a zeolite composition can be chosen from faujasite (FAU)-$M_x$, chabazite (CHA)-$N_y$, and combinations thereof, where M is a positive ion and $_x$ is a value between 0 and 1, and where N is a positive ion and $_y$ is a value between 0 and 1. For example, a zeolite composition according to the present disclosure can include at least faujasite-H having a $SiO_2$ to $Al_2O_3$ of at least 5.

In some embodiments, a zeolite composition can include tetrahedra in addition to $AlO_4$ tetrahedra and $SiO_4$ tetrahedra, which can provide the zeolite composition with one or more properties that help control relative humidity within a target range according to the present disclosure. In some embodiments, a zeolite composition can include $AlO_4$ tetrahedra, $PO_4$ tetrahedra, and $SiO_4$ tetrahedra, which are referred to as "SAPO" (silica, aluminum, phosphorous, and oxygen) zeolites. For example, a zeolite composition that includes $PO_4$ tetrahedra can have a linear formula of $(SiO_2)x(Al_2O_3)y(P_2O_5)z$, where x, y, and z are independently from each other. In some embodiments, $0 < x \leq 1$, or even $0.2 < x < 0.8$. In some embodiments, $0 < y \leq 1$, or even $y=1$. In some embodiments, $0 < z \leq 1$, or even $z=1$.

In some embodiments, a zeolite composition can include one or more zeolite compositions that have been modified with reactive coupling agents such as salivating agents to form a "silylated, zeolite composition." A silylated, zeolite composition can be prepared using one or more organosilanes as silyating agents. Non-limiting examples of suitable organosilanes include mono-, di-, trichlorosilanes, and combinations thereof. The organosilanes can include one or more alkyl chains.

In some embodiments, a zeolite composition can include one or more zeolite compositions that have been modified by introducing crystal lattice defects, which can provide the zeolite composition with one or more properties that help control relative humidity within a target range according to the present disclosure.

Desiccant, including zeolite compositions according to the present disclosure, can be included in any desired form such as granular form and/or formed into a particular shape having desirable surface area characteristics. For example, a zeolite composition can be blended with one or more binder materials and pressed into any desirable form and size such as beads, a puck, and the like.

A zeolite composition according to the present disclosure can be contained within a container that is disposed within the housing of an electronic device along with one or more electronic components. A wide variety of locations within an electronic device can be selected for disposing the first container. In some embodiments, the interior space of an electronic device can include a dedicated structure for housing the container. In some embodiments, the dedicated structure can be what is referred to as an environmental control module (ECM). For example, an environmental control module can be disposed within the interior space of an electronic device and the container can be disposed within the environmental control module. In other embodiments, the container is the same as the ECM.

In some embodiments, at least a portion of the container (e.g., ECM) housing includes a membrane that is permeable to water vapor, and impermeable to solid so as to permit exchange of water vapor between the inside of the container and the interior gas space of the electronic device while at the same time containing any solid particles within the container. In some embodiments, a suitable membrane can be made out of one or more polymeric fluorocarbons, polyesters, polyamides, styrene-butadiene copolymers, and combinations thereof. In some embodiments, a polymer membrane can be made out of polytetrafluoroethylene. In some embodiments, a polymer membrane can be made out of polyethylene terephthalate.

Examples of environmental control modules are reported in U.S. Pat. Nos. 6,266,208 (Voights), 8,867,164 (Brown), and 11,024,343 (Luebben et al.), wherein the entirety of each patent is incorporated herein by reference.

A wide variety of container (e.g., ECM) configurations can be used with zeolite compositions according to the present disclosure. In some embodiments, an ECM can be configured to have one internal compartment to contain zeolite compositions according to the present disclosure alone or in combination with one or more other compositions as described herein. In other embodiments, an ECM can be configured to have two more internal compartments that are one or more of physically and thermally isolated from each other. For example, one of the compartments can be used to contain zeolite compositions according to the present disclosure alone or in combination with one or more other compositions as described herein, while one or more other compartments can be used to contain other compositions or devices.

Figure 2:
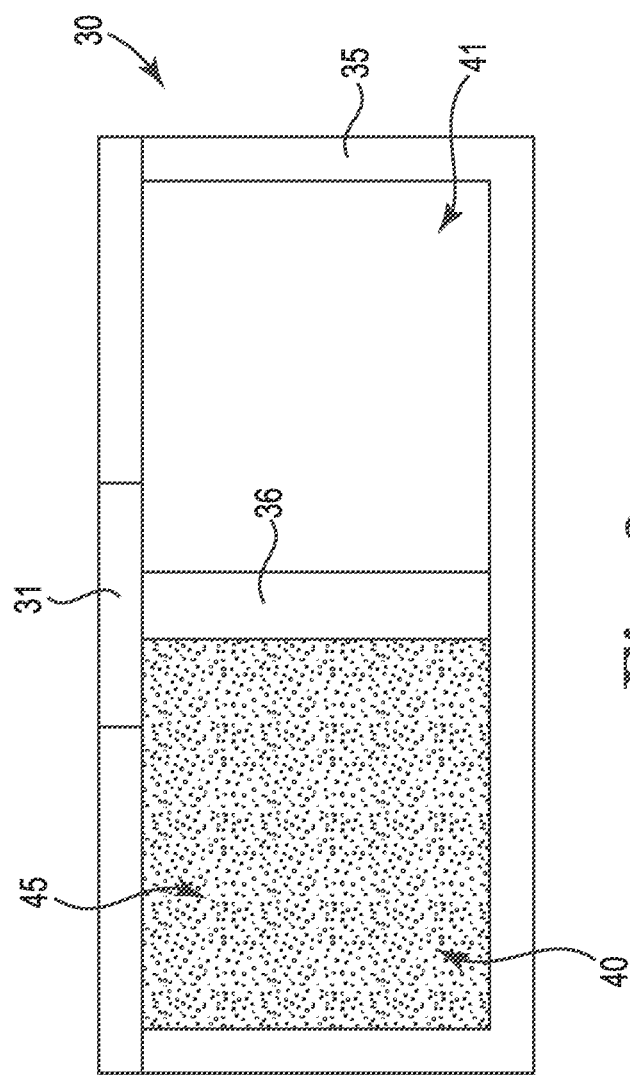
FIG. 2 is a cross-sectional, schematic showing one embodiment of the environmental control module in FIG. 1.

A non-limiting example of an ECM according to the present disclosure is described with respect to FIG. 2, which shows a cross-sectional, schematic of the environmental control module (ECM) 30 in FIG. 1. ECM 30 includes an ECM outer frame 35 and an inner wall 36 to separate a first compartment 40 from a second compartment 41. As shown, first compartment 45 can be filled with one or more zeolite compositions 45 according to the present disclosure alone or in combination with one or more other compositions.

Second compartment 41 could be filled with one or more other compositions. Non-limiting examples of such one or more other compositions that could be place in second compartment 41 include other compositions to help manage relative humidity or compositions and/or devices for generating oxygen such as those described in U.S. Pat. No. 11,024,343 (Luebben et al.), wherein the entirety of said patent is incorporated herein by reference.

The inner wall 36 can help physically separate and thermally insulate the first compartment 40 from the second compartment 41. For example, inner wall 36 can insulate the one or more zeolite compositions 45 in the first compartment 40 from a heater module (not shown) that may be positioned in the second compartment 41 to generate oxygen so that the one or more zeolite compositions 45 are not heated to an undue degree, thereby causing moisture to transfer out of the one or more zeolite compositions 45. The ECM 30 can be positioned within hard disk drive 9 with the assistance of a top cover, gasketing, and the like. The ECM 30 also includes a membrane schematically represented by 31, which permits water vapor to pass between the interior and exterior of ECM 30.

Optionally, in addition to the one or more zeolite compositions according to the present disclosure, an electronic device can include additional compositions and/or devices to help manage relatively humidity of the interior gas space of an electronic device. Non-limiting examples of such additional compositions include saturated salt solution, desiccant other than one or more zeolite compositions according to the present disclosure, and combinations thereof Non-liming examples of such other desiccants include silica gel, activated alumina, alumina, calcium oxide, activated carbon, calcium sulfate, magnesium aluminum silicate, and combinations thereof.

Non-liming examples of such saturated salt solutions are described in U.S. Pat. No. 10,566,031 (Brand), wherein the entirety of said patent is incorporated herein by reference. Non-liming examples of such devices are described in U.S. Pat. No. 10,593,372 (Yap et al.), wherein the entirety of said patent is incorporated herein by reference.

Optionally, in addition to the one or more zeolite compositions according to the present disclosure, an electronic device can include additional compositions for other purposes. One non-limiting example of such additional compositions includes activated carbon to adsorb volatile organic compounds (VOCs). Another non-limiting example of such additional compositions includes materials for generating oxygen as mentioned herein above.

Zeolite compositions according to the present disclosure permit passive control of relative humidity of the interior gas space of an electronic device as described herein under a variety of conditions such as during storage, during operation of the electronic device (e.g., during read/write operations of a hard disk drive), and the like. In some embodiments, the relative humidity can be passively controlled for the service life of the electronic device.

As used herein, "passively" controlling the relative humidity of the interior gas space of an electronic device refers to one or more zeolite compositions according to the present disclosure controlling water vapor in the interior gas space of an electronic device through their inherent physical and chemical properties that cause water vapor to be adsorbed and/or desorbed by the one or more zeolite compositions. Electrical power is not necessary for the one or more zeolite compositions to absorb and/or desorb water vapor. Accordingly, the type and amount of zeolite compositions according to the present disclosure can be selected to provide the desired relative humidity as described herein for a given interior gas space of an electronic device. In addition to providing the desired relative humidity under service conditions and for the service life of an electronic device, additional considerations for type and amount of one or more zeolite compositions include physical space within an electronic device. In some embodiments, one or more zeolite compositions can be included in amount in the range from 0.1 to 10 grams, from 0.5 to 4 grams, or even from 0.7 grams to 2 grams. In some embodiments, one or more zeolite compositions can be combined with a binder and pressed into a shape such as a tablet.

Passive control of relative humidity is in contrast to active control of relative humidity, which refers to the controlled application electrical power to a device to control the rate at which water vapor is generated or removed. An example of a device that can actively manage relative humidity via electrical power is describe in described in U.S. Pat. No. 10,593,372 (Yap et al.).

EXAMPLE

This example evaluated the zeolite compositions below to determine whether the given zeolite composition could provide the interior gas space of the HDD with a relative humidity from 1% to 5% at a temperature in the range from 0 to 75° C. as determined by the Relative Humidity test method described herein above.

Zeolite Compositions 4A molecular sieves from Delta Adsorbents; SAPO zeolite obtained from the Mitsubishi Chemical Corporation under the tradename AQSOA™ Z02 zeolite; Zeolite obtained from Zeolyst International under the tradename CBV100 zeolite; Zeolite obtained from Zeolyst International under the tradename CBV400 zeolite; and Zeolite obtained from Zeolyst International under the tradename CFG1 zeolite.

Results and Discussion

Between 220 and 290 HDDs were tested for each zeolite composition mentioned above according to the Relative Humidity test method. The AQSOA™ Z02 zeolite and CFG1 zeolite were the only zeolites tested that each had 99% or more of the HDDs are between the minimum relative humidity (1%) and maximum relative humidity (5%). All HDDs tested with the 4A molecular sieves had an average relative humidity of 0%; a fraction >1% of the HDDs with CBV100 zeolite and CBV400 zeolite had a relative humidity of 0%.

What is claimed is:

1. An electronic device comprising:
a housing having an interior gas space;
one or more electronic components disposed within the housing; and
a desiccant component comprising one or more zeolite compositions in an amount that can adsorb and/or desorb water vapor to provide the interior gas space with a relative humidity from greater than 0.5% to less than 8% at a temperature in the range from 0 to 75° C. as determined by Relative Humidity test method, wherein the one or more zeolite compositions comprise at least one zeolite composition having $AlO_4$ tetrahedra, $PO_4$ tetrahedra, and $SiO_4$ tetrahedra, and a linear formula of $(SiO_2)x(Al_2O_3)y(P_2O_5)z$, wherein $0<x\le1$, $0<y\le1$, and $0<z\le1$.

2. The electronic device of claim 1, wherein the one or more zeolite compositions comprise at least one silylated, zeolite composition.

3. The electronic device of claim 1, wherein the one or more zeolite compositions can adsorb and/or desorb water vapor to provide the interior gas space with a relative humidity from 1% to 5% at a temperature in the range from 0 to 75° C. as determined by the Relative Humidity test method.

4. The electronic device of claim 1, wherein the one or more zeolite compositions can adsorb and/or desorb water vapor to provide the interior gas space with the relative humidity for a time period of at least 6 months.

5. The electronic device of claim 1, wherein the one or more zeolite compositions can adsorb and/or desorb water vapor to provide the interior gas space with the relative humidity for a time period of up to at least 7 years.

6. The electronic device of claim 1, wherein the interior gas space comprises helium gas and the electronic device has a helium leak rate of $50\times10^-8$ atm (atmosphere) cc (cubic centimeter)/second or less at 25° C.

7. The electronic device of claim 1, further comprising a container disposed within the interior gas space, wherein the one or more zeolite compositions are contained within the container, and wherein at least a portion of the container is permeable to water vapor.

8. The electronic device of claim 7, wherein the container is an environmental control module.

9. The electronic device of claim 1, further comprising an environmental control module and a container, wherein the environmental control module is disposed within the interior gas space, wherein the one or more zeolite compositions are contained within the container, wherein at least a portion of the container is permeable to water vapor, and wherein the container is disposed within the environmental control module.

10. The electronic device of claim 1, wherein the electronic device is a hard disk drive.

11. An electronic device comprising:
a housing having an interior gas space;
one or more electronic components disposed within the housing; and
a desiccant component comprising one or more zeolite compositions in an amount that can adsorb and/or desorb water vapor to provide the interior gas space with a relative humidity from greater than 0.5% to less than 8% at a temperature in the range from 0 to 75° C. as determined by Relative Humidity test method, wherein the one or more zeolite compositions comprise at least one zeolite composition having a mole ratio of $SiO_2$ to $Al_2O_3$ equal to 3 or greater, and a cation chosen from hydrogen, fluoride, ammonium, quaternary ammonium, and combinations thereof.

12. The electronic device of claim 11, wherein the mole ratio of $SiO_2$ to $Al_2O_3$ is equal to 4 or greater.

13. The electronic device of claim 12, wherein the mole ratio of $SiO_2$ to $Al_2O_3$ is equal to 10 or greater.

14. The electronic device of claim 11, wherein the cation comprises hydrogen.

15. The electronic device of claim 14, wherein the at least one zeolite composition further comprises a cation chosen from sodium, potassium, calcium, magnesium, and combinations thereof.

16. The electronic device of claim 11, wherein the one or more zeolite compositions comprise at least one zeolite composition chosen from faujasite-$M_x$, chabazite-$N_y$, and combinations thereof, wherein M is a positive ion and $_x$ is a value between 0 and 1, and wherein N is a positive ion and $_y$ is a value between 0 and 1.

17. The electronic device of claim 16, wherein the one or more zeolite compositions comprise at least faujasite-H having a $SiO_2$ to $Al_2O_3$ of at least 5.

18. The electronic device of claim 11, wherein the one or more zeolite compositions can adsorb and/or desorb water vapor to provide the interior gas space with a relative humidity from 1% to 5% at a temperature in the range from 0 to 75° C. as determined by the Relative Humidity test method.

19. The electronic device of claim 11, wherein the one or more zeolite compositions can adsorb and/or desorb water vapor to provide the interior gas space with the relative humidity for a time period of up to at least 7 years.

20. The electronic device of claim 11, wherein the interior gas space comprises helium gas and the electronic device has a helium leak rate of $50 \times 10^{-8}$ atm (atmosphere) cc (cubic centimeter)/second or less at 25° C.

21. The electronic device of claim 11, wherein the electronic device is a hard disk drive.

* * * * *